United States Patent Office 3,305,345
Patented Feb. 21, 1967

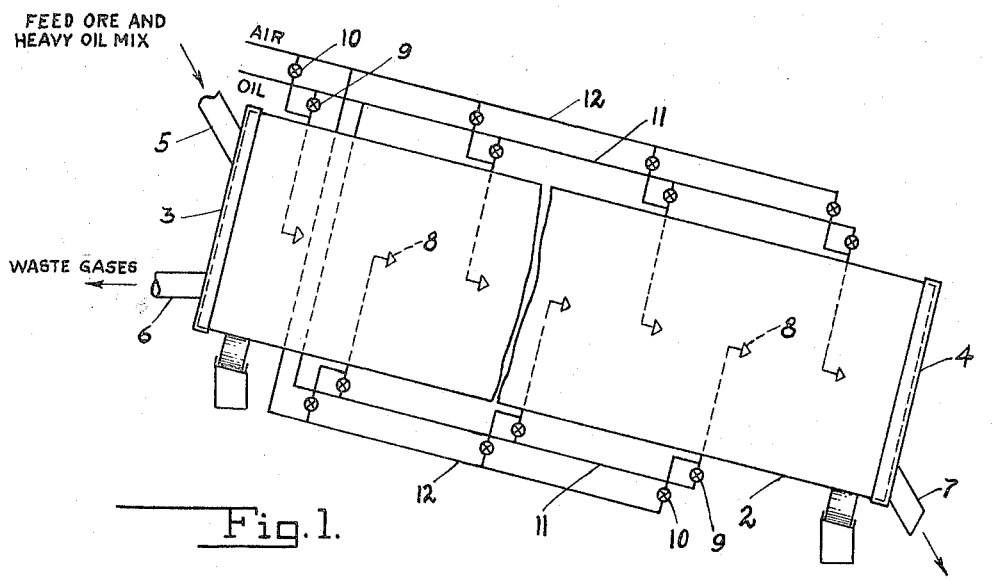
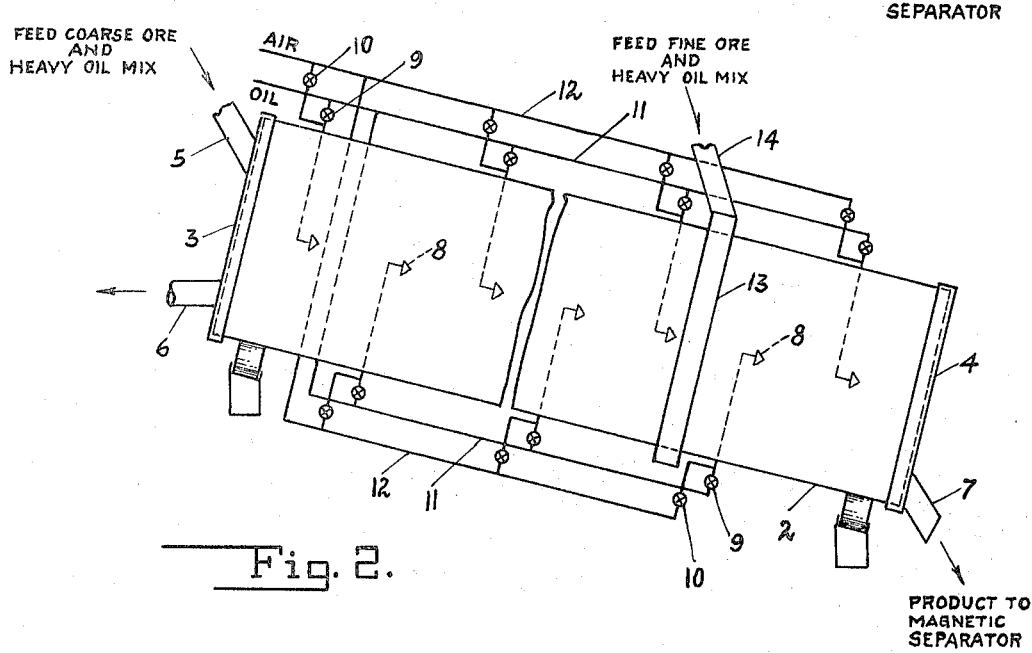

3,305,345
MAGNETIZING-ROASTING OF IRON ORE
Hans Rausch, Oberursel, Taunus, Walter Koch, Offenbach (Main), and Heinrich Meiler, Lorsbach, Taunus, Germany, assignors to Dravo Corporation, Pittsburgh, Pa., a corporation of Pennsylvania
Filed Aug. 22, 1963, Ser. No. 303,867
Claims priority, application Germany, Aug. 22, 1962, M 53,982
5 Claims. (Cl. 75—1)

This invention relates to the separation of iron ore from associated mineral constituents by what is termed magnetizing roasting whereby iron in the trivalent form as in hematite or limonite ($Fe_2O_3$) is at least partially reduced to the divalent form ($Fe_3O_4$) or magnetic oxide capable of being then separated from non-magnetic material with which it is mixed.

The process of magnetizing roasting is not per se new. It is usually practiced by heating the trivalent ore in finely divided form along with those minerals or gangue with which it occurs in nature in a rotary kiln through which a reducing gas is passed while heat is supplied to the exterior of the kiln or other indirect heating provided. A reducing gas is used because the usual solid reducing agents such as coke or coke breeze are too unreactive. The use of petroleum fuels has been confined to burners firing against the exterior of the kiln or in other indirect heating methods because direct contact of the flame with the ore was not considered feasible. Even natural gas or hydrocarbon waste gases are not suitable as reducing gases unless converted by processing to CO and $H_2$.

Magnetizing roasting, therefore, is most economical where sufficient amounts of reducing gas are available from other sources, such as blast furnace or coke oven gas. Usually it is desirable to effect roasting and magnetic separation of the ore at the mine where such sources of reducing gases are not normally close by. This necessitates the provision of some special gas producer with the attendant increased costs of initial investment, operation and transportation of raw fuel to the producer.

The principal object of the present invention is to provide an improved method for the magnetic roasting of iron ore without the use of reducing gases from an external source.

An important consideration in the reduction of the ore from the higher to the lower oxide is that reduction shall be sufficient to convert enough of the higher oxide to magnetite that a substantial amount of the iron can be magnetically removed. There may thus be only a partial conversion but the magnetite is so intimately associated with the original ore that both the magnetic and non-magnetic oxides will be responsive to magnetic separation. It is equally important that the reduction not be carried to a point where there is produced ferrous oxide instead of magnetite since the ferrous oxide is not magnetic.

Contrary to expectation, we have discovered that if a heavy petroleum fuel substance, such as that known generally as "Bunker-C-Oil" which at room temperature is a solid or semi-solid is mixed with the ore and the mixture is introduced into the kiln and ignited that the volatiles can be burned to supply heat while the residue produces coke in a nascent or highly reactive state that will combine with oxygen of the $Fe_2O_3$ to reduce it to $Fe_3O_4$.

With this procedure it will be seen that oil burners may be provided inside the kiln, some of which may supply excess air to effect combustion of the pyrolysis volatiles produced from the oil; these burners also supplying heat to initiate and continue the combustion process in the kiln while other burners may simply provide air after the kiln has been started up.

Where the ore being processed is comprised of coarse and fine particles, it may be screened and the coarse particles may be introduced into the rotary kiln along with the heavy oil ahead of the fines, also mixed with heavy oil. In this way the coarse material will be in the reducing environment longer than the fines, thereby avoiding over reduction of the fines.

The invention may be further understood by reference to the accompanying drawings, in which:

FIG. 1 is a schematic elevation of a rotary kiln of known construction for the practice of our invention; and FIG. 2 is a similar view where the kiln is provided with a feed for coarse material at the charging end and fine material intermediate its ends.

Referring first to FIG. 1, a rotary kiln is schematically indicated at 2 with a charging end 3 and discharge end 4. The charging end 3 is provided with an inlet 5 for the introduction of the ore and heavy oil which have been previously mixed and there is a waste gas outlet 6 through which combustion and waste gases are carried out of the kiln. The discharge end has an outlet 7 for the roasted product.

The kiln as described is of known construction designed to exclude any substantial inflow of atmospheric air. Passing through the shell of the kiln are a number of burners 8 which rotate with the kiln and each is provided with separate fuel and air valves 9 and 10 respectively in branches leading from fuel and air manifolds 11 and 12 respectively extending along the kiln. The burners are designed to project a radially flaring flame axially of the kiln. With this arrangement air and oil may be introduced with an excess of air, a deficiency of air or air alone and this can be varied from burner to burner according to conditions along the length of the kiln.

The kiln shown schematically in FIG. 2 is the same as the one shown in FIG. 1 and similar reference numerals have been used to designate corresponding parts, and differs only in that intermediate its ends, and generally but not necessarily closer to the discharge end there is a hood 13 outside the kiln through which more feed material may be introduced from a supply chute 14. This modification is designed particularly for use with ores that are desirably separated into coarse and fine components as above described, the material with heavy oil being introduced at the charging end and the fines with heavy oil through chute 14.

While the burners may be individually adjusted to maintain a controlled condition inside the kiln along its length, it is not ordinarily necessary that any be operated with a reducing or neutral flame because of the need to supply excess air for the combustion of the volatiles from the fuel in the ore. Toward the charging end of the kiln more air is required than at the discharge end, and it may, therefore, be that burners near the charging end will be used at times only to introduce air.

Since a reducing flame in the burner is not required and there is desirably an excess of air supplied to the burners, it is possible to supply the burners with a petroleum fuel, even the Bunker C oil similar to that mixed with the ore. This is because the burning of such fuel in a reducing flame results in the formation of soot which actually interferes with the reduction of the ore and is in no way comparable to the coke residue produced in the body of the ore by the present process. With an excess of air at the burners heavy soot production is not a problem and it becomes possible to use direct flame inside the kiln instead of indirect heat.

An incidental advantage results because the coke is produced in intimate association with the ore particles; it is not necessary to provide within the kiln the internal lifting buckets or agitators customarily used where a reducing gas is employed.

In the following examples that compare the instant invention with existing practice, Example 1 utilizes coke breeze as the reducing agent; Example 2 utilizes manufactured or city gas as the reducing agent. Examples 3 and 4 use the process of the present invention utilizing the ores of Examples 1 and 2 respectively.

*Example 1*

Use of coke breeze as a solid reducing agent.
Ore: Quartzitic magnetite-hematite-ore, with 51.2% total Fe; 8.2% divalent Fe.
The magnetizing roasting occurs with 2% coke addition at 800° C.
Analysis of the magnetizing-roasted ore: 51.9% total Fe; 9.3% divalent Fe.
Result of the magnetic separation:

|  | Weight Percent | Fe, Percent | Fe, Distribution |
|---|---|---|---|
| Concentrate | 47.5 | 68.7 | 62.9 |
| Tailings | 52.5 | 36.7 | 37.1 |
| Feed | 100.0 | 51.9 | 100.0 |

*Example 2*

Use of city gas as a reducing agent.
Ore: Earthy hematite as a binder of a sandstone with 28.3% total Fe; 1.1% divalent Fe.
The magnetizing roasting occurred at 800° C.
Analysis of the magnetizing-roasted ore: 29.5% total Fe; 12.3% divalent Fe.
Results of the magnetic separation:

|  | Weight Percent | Fe, Percent | Fe, Distribution |
|---|---|---|---|
| Concentrate | 42.2 | 59.9 | 85.7 |
| Tailings | 57.8 | 7.3 | 14.3 |
| Feed | 100.0 | 29.5 | 100.0 |

*Example 3*

Use of heavy oil as a reducing agent.
Ore: Quartzitic magnetite-hematite-ore with 51.2% total Fe; 8.2% divalent Fe.
The magnetizing roasting occurred with the addition of 2% heavy fuel oil at 800° C.
Analysis of the magnetizing-roasted ore: 54.7% total Fe; 19.0% divalent Fe.

|  | Weight Percent | Fe, Percent | Fe, Distribution |
|---|---|---|---|
| Concentrate | 75.6 | 68.8 | 95.1 |
| Tailings | 24.4 | 11.0 | 4.9 |
| Feed | 100.0 | 54.7 | 100.0 |

*Example 4*

Use of heavy fuel oil as a reducing agent.
Ore: Earthy hematite as binder of a sandstone with 28.3% total Fe; 1.1% divalent Fe.
The magnetizing roasting occurred with the addition of 2% heavy fuel oil at 800° C.
Analysis of the magnetizing-roasted ore: 29.6% total Fe; 11.6% divalent Fe.
Result of the magnetic separation:

|  | Weight Percent | Fe, Percent | Fe, Distribution |
|---|---|---|---|
| Concentrate | 42.2 | 59.2 | 84.4 |
| Tailings | 57.8 | 8.0 | 15.6 |
| Feed | 100.0 | 29.6 | 100.0 |

From the foregoing examples its will be seen that the present invention using heavy petroleum fuel in the body of the ore is vastly more effective than the use of coke and is comparable to the presently most successful practice utilizing a manufactured reducing gas. It is of course desirable to use in the ore a heavy petroleum fuel such as Bunker C because of the need to produce coke in situ in the ore and desirable to provide volatiles that enable a reducing atmosphere to be maintained in the kiln notwithstanding the use of excess air in the fuel burners.

Surprising also is the discovery that the quantity of petroleum coke produced by the fuel oil added to the ore is sufficient to reduce the ore, said quantity being only slightly above the theoretically required amount. For ores such as are generally encountered where magnetizing roasting is used having a total iron content somewhere between 30 to 55%, this corresponds to a volume of oil ranging from around 1.5% to 5% of the weight of the ore. This is in the approximate range of 5 to 10% of oil to the iron content of the ore.

Waste gases of course may be used according to known methods to recover heat and increase thermal efficiency, but this per se forms no part of the present invention and has not been illustrated or described.

We claim:

1. The method of effecting the roasting of hematite ore to effect reduction of $Fe_2O_3$ to $Fe_3O_4$ comprising the steps of mixing the ore with heavy fuel oil in an amount at least theoretically necessary to effect said reaction, heating said mixture in a closed environment to a temperature of approximately 800° C. to form gaseous pyrolysis products from the heating of the oil and nascent oil coke in said environment and introducing sufficient oxygen into said environment to burn said gaseous pyrolysis products without heavy soot formation whereby said nascent oil coke is diffused through the bed in situ and functions as the reducing reactant.

2. The method of effecting the roasting of hematite ore as defined in claim 1 in which the fuel oil is in the range of 1.5% to 5% of the weight of the ore where the iron content of the ore ranges between 30% and 55%.

3. The method of effecting the roasting of hematite ore as defined in claim 1 in which heating is effected by direct-fired burners within said closed environment and introducing into the environment an excess of air to burn the said gaseous pyrolysis products and supply heat to the environment.

4. The method of effecting the roasting of hematite ore as defined in claim 1 in which the closed environment is a rotating kiln, introducing the mix into one end of the kiln and removing roasted ore from the other end, said kiln having fuel burners arranged therealong, and operating the burners to supply heat to the interior of the kiln and introducing excess air for the burning of said gaseous pyrolysis products through said fuel burners.

5. The method of effecting the roasting of hematite ore as defined in claim 1 in which the ore is first separated into coarse and fine particles and both the coarse and the fines are then mixed with heavy fuel oil, said closed environment comprising a rotary kiln having burners arranged at intervals therealong and from one end of which the roasted material is discharged, the further steps of introducing the coarse particles and fuel oil into the end of the kiln opposite the discharge end, introducing the fines mixed with oil into the kiln intermediate its ends, and operating the burners to supply heat to the interior of the kiln and to introduce sufficient air to burn the gaseous pyrolysis products whereby the coarse and the fine particles are roasted at the same time and recombined in the kiln, but the coarser particles are heated for a longer time than the fines.

References Cited by the Examiner

UNITED STATES PATENTS

| | | | |
|---|---|---|---|
| 2,913,331 | 11/1959 | Dean | 75—7 |
| 3,034,884 | 5/1962 | Meyer et al. | 75—7 |
| 3,097,156 | 9/1963 | Johnson et al. | 75—1 |
| 3,132,023 | 5/1964 | Backstrom | 75—1 |

FOREIGN PATENTS

| | | |
|---|---|---|
| 513,196 | 5/1955 | Canada. |

BENJAMIN HENKIN, *Primary Examiner.*